US012724036B2

(12) United States Patent
Perez et al.

(10) Patent No.: US 12,724,036 B2
(45) Date of Patent: Sep. 1, 2026

(54) AERODYNAMIC MEASUREMENT PROBE

(71) Applicant: THALES, Meudon (FR)

(72) Inventors: François Perez, Chatellerault (FR); Eric Loil, Chatellerault (FR); Serge Petit, Valence (FR)

(73) Assignee: THALES, Meudon (FR)

( * ) Notice: Subject to any disclaimer, the term of this patent is extended or adjusted under 35 U.S.C. 154(b) by 296 days.

(21) Appl. No.: 18/563,832

(22) PCT Filed: May 20, 2022

(86) PCT No.: PCT/EP2022/063675
§ 371 (c)(1),
(2) Date: Nov. 22, 2023

(87) PCT Pub. No.: WO2022/248345
PCT Pub. Date: Dec. 1, 2022

(65) Prior Publication Data

US 2024/0310403 A1 Sep. 19, 2024

(30) Foreign Application Priority Data

May 27, 2021 (FR) ....................................... 2105491

(51) Int. Cl.
*G01P 13/02* (2006.01)
*G01P 5/06* (2006.01)

(52) U.S. Cl.
CPC .............. *G01P 13/025* (2013.01); *G01P 5/06* (2013.01)

(58) Field of Classification Search
CPC ................................ G01P 5/06; G01P 13/025
See application file for complete search history.

(56) References Cited

U.S. PATENT DOCUMENTS 4,901,566 A * 2/1990 Boetsch .................. G01P 13/02 73/180
9,233,760 B2 * 1/2016 Perju ..................... G01P 13/025
2004/0188945 A1 9/2004 Poincet et al.
2016/0033356 A1 2/2016 Deangelo et al.

FOREIGN PATENT DOCUMENTS

EP 3 444 618 B1 4/2020
NL 2 012 457 A 12/2015

* cited by examiner

*Primary Examiner* — Jill E Culler
(74) *Attorney, Agent, or Firm* — BakerHostetler

(57) ABSTRACT

An aerodynamic measurement probe intended to measure a local angle of attack of an airflow circulating along the fuselage of an aircraft, the support comprising a circular cover with a central opening which is passed through by the mobile shaft, the outer surface of the cover comprising a frustoconical face exhibiting symmetry of revolution about the longitudinal axis, the cover comprising polyether ether ketone reinforced with glass or carbon fibers, with a thermal conductivity of less than 3 $W \cdot m^{-1} \cdot K^{-1}$ and being provided with metallic inserts at its fastenings, at least one metallic electrical continuity insert being configured to establish an electrical connection between the inner part of the probe and an interface of the metallic insert disposed under the lower periphery of that part of the metallic insert which is furthest away from the shaft.

4 Claims, 5 Drawing Sheets

AERODYNAMIC MEASUREMENT PROBE

CROSS-REFERENCE TO RELATED APPLICATIONS

This application is a National Stage of International patent application PCT/EP2022/063675, filed on May 20, 2022, which claims priority to foreign French patent application No. FR 2105491, filed on May 27, 2021, the disclosures of which are incorporated by reference in their entireties.

FIELD OF THE INVENTION

The invention relates to an aerodynamic measurement probe intended to measure a local angle of attack of an airflow circulating along the fuselage of an aircraft, notably an angle-of-attack (AOA) or sideslip-angle (SSA) probe.

BACKGROUND

According to a known technique, aerodynamic measurement probes intended to measure an angle of attack (AOA) or a sideslip angle (SSA) comprise a rotatable assembly intended to be oriented along the axis of the airflow surrounding the aircraft on which the support fixed or secured to the fuselage is installed.

The measurement of the local angle of attack of an airflow against the fuselage of an aircraft is a parameter essential to the control of said aircraft. It makes it possible to define the direction of the velocity vector of the aircraft with respect to the flow of ambient air surrounding it.

Using a mobile assembly situated outside the aircraft consequently means said assembly is exposed to severe environmental conditions, including the risk of icing.

Probes having a protective panel of planar geometry are known. This protective panel provides geometric continuity with the fuselage of the supporting aircraft.

The known aerodynamic measurement probes do not make it possible to hold an aerodynamic measurement probe with an interface panel or cover having an optimized mass while still ensuring mechanical strength, electrical continuity and thermal protection.

A probe with a planar protective panel is known from document EP 3444618 B1, as illustrated in FIG. 1 corresponding to FIG. 2B of document EP 3444618 B1. The rotary element 26 has a base 24 which is totally submerged under the planar panel 14.

The burying of the base of the vane below the protective panel can adversely affect the measurement accuracy.

The absence of a stopping point for the flow on the base of the vane results in generation of return currents directed from downstream to upstream in the gap 50, taking account of the direction of the flow of air.

Such a probe makes it possible to limit the convective exchanges with the cold air (and the water droplets and crystals that it transports) but adversely affects the accuracy of the measurement.

Document EP 3444618 B1 mentions a planar panel made of aluminum or other metal, or made of another material that is suitable in terms of thermal conduction, such as titanium, polymers or composite materials.

However, in one embodiment for example described in document EP 3444618 B1, if the interface panel or cover were implemented with a polymer, the mechanical strength of the cover in different loading situations, the resistance to degradation over time and the electrical continuity between the mobile element and the fuselage are not ensured.

SUMMARY OF THE INVENTION

An aim of the invention is to overcome the problems cited above and notably to hold an aerodynamic measurement probe with an interface panel or cover having an optimized mass while still ensuring mechanical strength, electrical continuity and thermal protection.

What is proposed, according to one aspect of the invention, is an aerodynamic measurement probe intended to measure a local angle of attack of an airflow circulating along the fuselage of an aircraft, comprising a support, a heated body and a shaft that is able to rotate about a longitudinal axis with respect to the support and the body, the support, the body and the shaft being configured to form a gap between them, making it possible to maintain functional play so as to allow one end of the shaft to pivot freely in the support, and communicating with a circuit for discharging impurities, the shaft comprising a part internal to the support, a vane part external to the support and a base plate of the vane part connecting the internal part and the external part, the support comprising a circular cover or panel with a central opening which is passed through by the mobile shaft, the outer surface of the cover comprising a frustoconical face exhibiting symmetry of revolution about the longitudinal axis, the cover comprising polyether ether ketone reinforced with glass or carbon fibers, with a thermal conductivity of less than 3 $W \cdot m^{-1} \cdot K^{-1}$, and being provided with metallic inserts at its fastenings, at least one metallic insert being configured to establish an electrical connection between the inner part of the probe and an interface of the metallic insert disposed under the lower periphery of that part of the metallic insert which is furthest away from the shaft.

The use of a cover comprising polyether ether ketone reinforced with glass or carbon fibers, with a thermal conductivity of less than 3 $W \cdot m^{-1} \cdot K^{-1}$, and provided with metallic inserts at its fastenings makes it possible to hold an aerodynamic measurement probe with an interface panel or cover having an optimized mass while still ensuring mechanical strength, and the presence of at least one metallic electrical continuity insert configured to establish an electrical connection between the inner part of the probe and an interface of the metallic insert disposed under the lower periphery of that part of the metallic insert which is furthest away from the shaft.

Such materials make it possible to obtain a component of composite structure by thermoplastic injection molding, with recessed or stiffening areas making it possible to minimize its mass, an optimal contribution of the glass fibers for mechanical reinforcement or variation of certain properties of the material (expansion coefficient) in certain preferred directions of the component (anisotropy) and the installation of metallic inserts for managing stresses in terms of assembly, tightness and electrical continuity inherent to the probe.

According to one embodiment, the cover comprises first inserts made of stainless steel disposed in a circular manner toward the outside of the cover, and second inserts made of brass disposed in a circular manner toward the inside of the cover.

Thus, the thermal protection is reinforced with the presence of polyether ether ketone reinforced with glass or carbon fibers, with a thermal conductivity of less than 3 $W \cdot m^{-1} \cdot K^{-1}$, between the outer ring of inserts and the inner ring of inserts. The inserts make it possible to ensure the mechanical strength under different load situations by taking up the stresses and limiting the creep of the polyether ether ketone.

In one embodiment, a metallic electrical continuity insert comprises a first insert and a second insert and a stainless steel portion connecting said first insert and said second insert.

Thus, the electrical continuity is ensured between the internal part of the probe and the fuselage of the plane to which said probe is fitted.

According to one embodiment, the cover comprises a clearance on its upper part, configured for access to the upper part of the stainless steel portion of the metallic electrical continuity insert, in the vicinity of its second insert.

BRIEF DESCRIPTION OF THE DRAWINGS

The invention will be better understood on studying a few embodiments that are described by way of completely non-limiting examples and illustrated by the appended drawing, in which.

DETAILED DESCRIPTION

In the present description, the embodiments described are not limiting, and the features and functions that are well known to a person skilled in the art are not described in detail.

Figure 1:
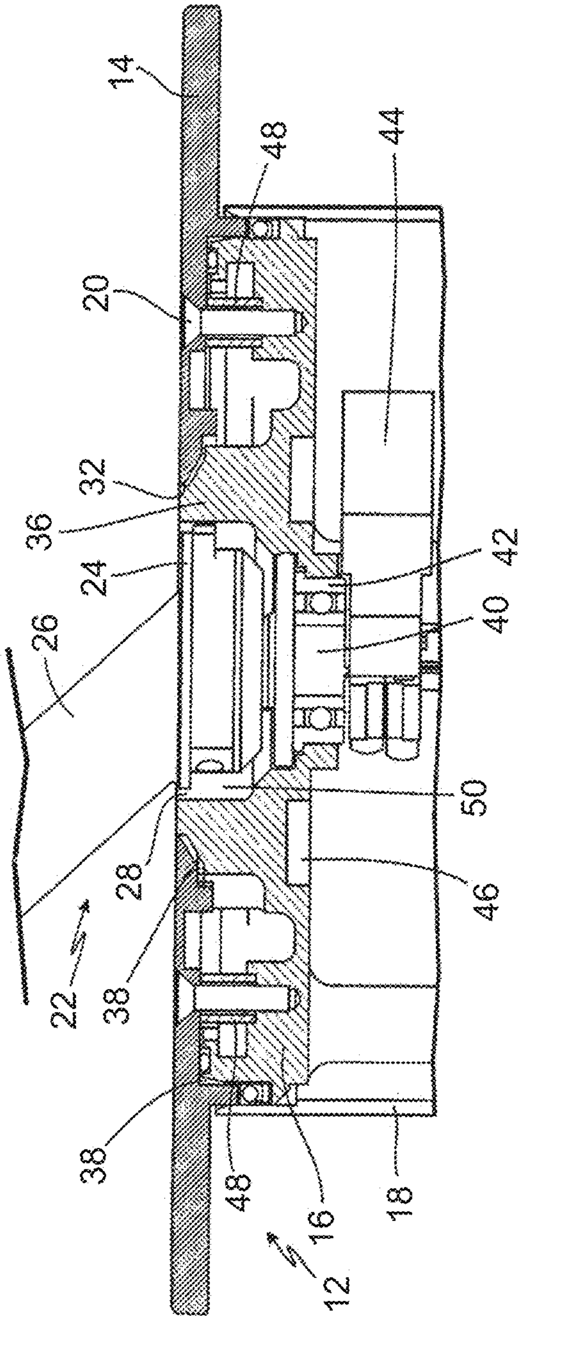
FIG. 1 schematically illustrates an aerodynamic measurement probe according to the prior art.
Figure 2:
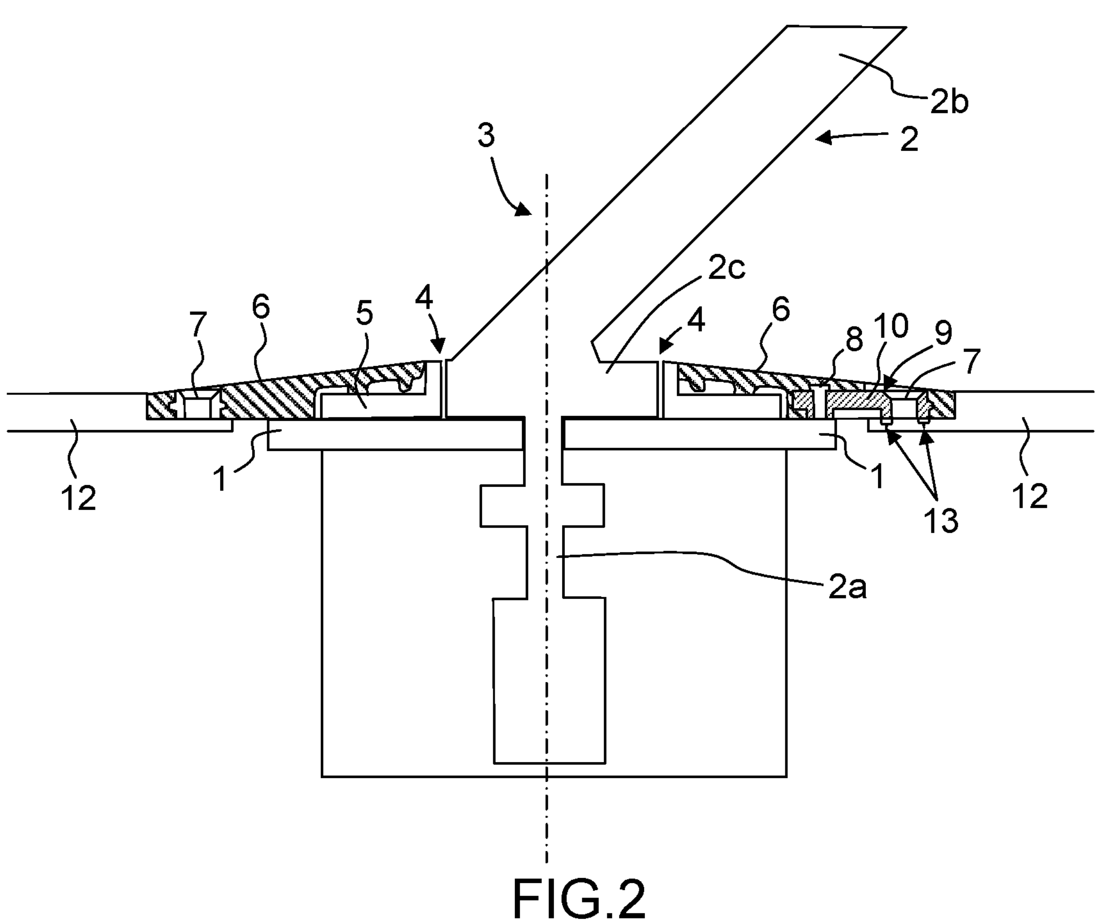
FIG. 2 schematically illustrates a sectional view of an aerodynamic measurement probe according to one aspect of the invention.

FIG. 2 schematically shows the upper part of an aerodynamic measurement probe intended to measure a local angle of attack of an airflow circulating along the fuselage of an aircraft, comprising a support 1, in the present case of circular form, and a shaft 2 that is able to rotate about a longitudinal axis 3 with respect to the support 1.

The support 1 and the mobile shaft 2 are configured to form a gap 4 between them which makes it possible to maintain functional play so as to allow one end of the shaft 2 to pivot freely in the support 1, and which communicates with a circuit for discharging impurities.

The shaft 2 comprises a part 2*a* internal to the support 1, a vane part 2*b* external to the support 1 and a base plate 2*c* or base of the vane part 2*b* connecting the internal part 2*a* and the external vane part 2*b*.

The body 5 contains a heating device, as does the external vane part 2*b* of the shaft 2. The body 5 comprises a circular central opening, passed through by the mobile shaft 2, and is sandwiched between the support 1 and a cover 6.

The support 1 comprises the circular cover 6 with a central opening, the circular opening of which is passed through by the mobile shaft 2.

The cover 6 comprises polyether ether ketone reinforced with glass or carbon fibers, with a thermal conductivity of less than 3 $W \cdot m^{-1} \cdot K^{-1}$, and is provided with metallic inserts 7, 8 at its fastenings.

The cover 6 comprises an outer ring of first inserts 7 made of stainless steel disposed in a circular manner toward the outside of the cover 6 in order to fasten the panel or the cover 6 to the plane fuselage. The cover 6 also comprises an inner ring of second inserts 8 made of brass disposed in a circular manner toward the inside of the cover 6 in order to fasten the cover 6 to the support 1.

A cover 6 comprising polyether ether ketone reinforced with glass or carbon fibers, with a thermal conductivity of less than 3 $W \cdot m^{-1} \cdot K^{-1}$, enables sufficient thermal insulation of the probe under severe flight conditions.

Furthermore, such materials have a density of between 1200 $kg/m^3$ and 1600 $kg/m^3$ making it possible to optimize the mass with respect to an aluminum panel, the density of which is 2700 $kg/m^3$.

Furthermore, such materials are anisotropic (property of being dependent on direction, therefore exhibiting different characteristics depending on its orientation). The implementation of the cover 6 makes it possible to orient the glass or carbon fibers in the horizontal plane and to thus limit the difference in expansion coefficients between the cover or interface panel 6 (18 ppm/° C. in the direction of the mean plane of the panel) and the aluminum counter-panel in the region of the fuselage of the plane (23 ppm/° C.), and therefore the thermomechanical stresses produced. Whereas in the transverse plane, the expansions of the polyether ether ketone reinforced with glass or carbon fibers are higher (greater than 40 ppm/° C.).

The presence of metallic inserts 7, 8 at its fastenings make it possible to ensure the mechanical strength under different load situations such as tightening of screws, differential expansions, pressure differential, vibration.

The cover 6 comprises overmolded first inserts 7 made of stainless steel disposed in a circular manner toward the outside of the cover 6, and ultrasonically attached second inserts 8 made of brass disposed in a circular manner toward the inside of the cover 6.

The cover 6 comprises at least one metallic electrical continuity insert 9 configured to establish an electrical connection between the inner part of the probe and an interface 13 of the metallic insert 9 disposed under the lower periphery of that part of the metallic insert which is furthest away from the shaft 2.

Figure 3:
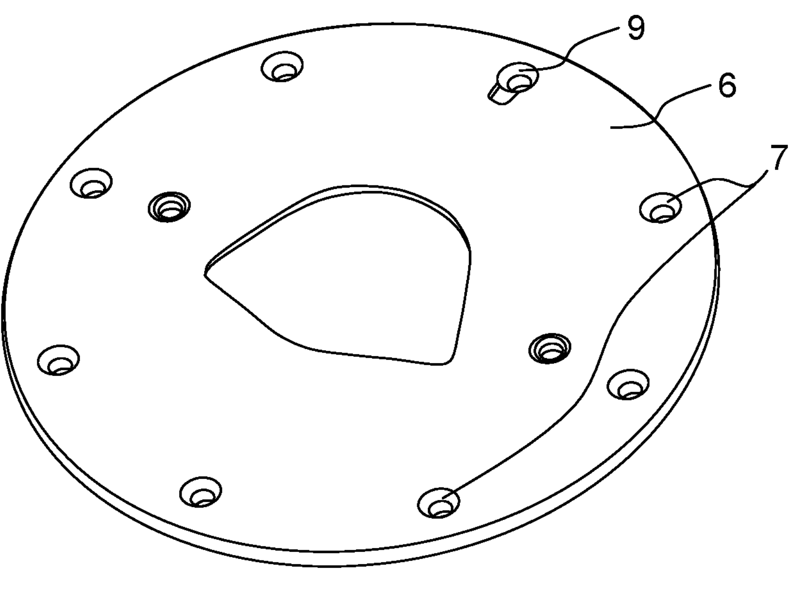
FIG. 3 schematically illustrates a top view of the cover of the probe according to one aspect of the invention.
Figure 4:
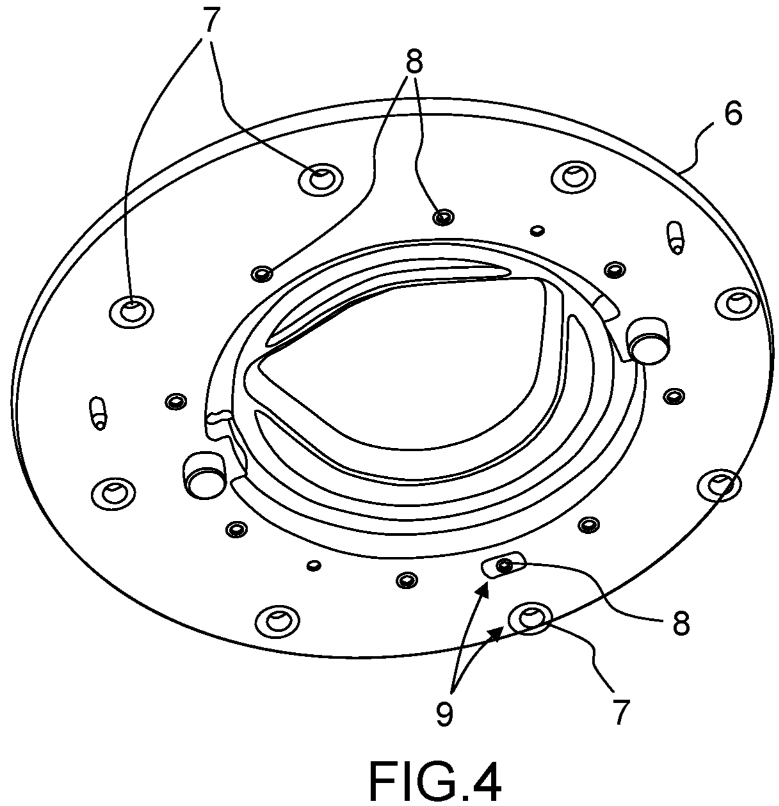
FIG. 4 schematically illustrates a bottom view of the cover of the probe according to one aspect of the invention.
Figure 5:
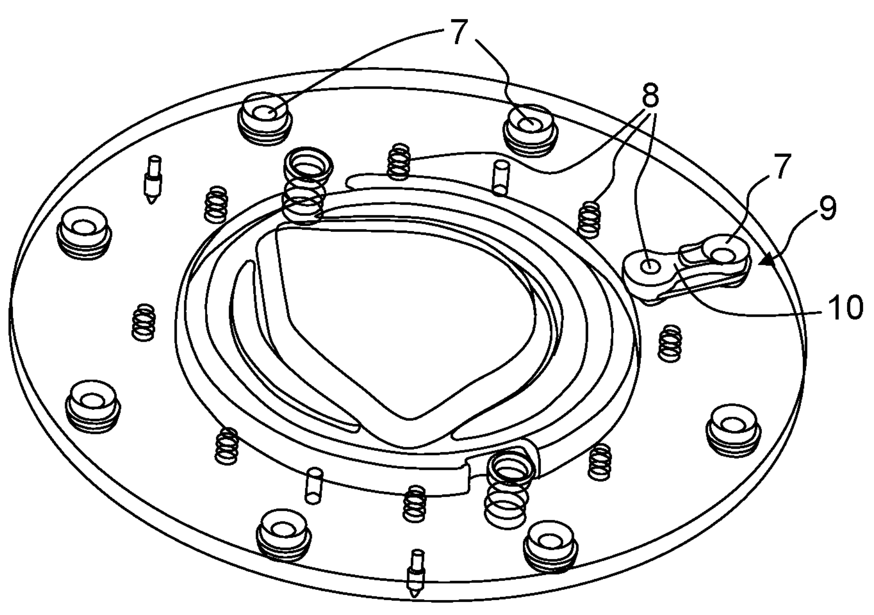
FIG. 5 schematically illustrates a transparent bottom view of the cover of the probe according to one aspect of the invention.

FIG. 3, FIG. 4 and FIG. 5 respectively show one embodiment of the cover 6 and of the inserts 7, 8 and 9 in a top view, a bottom view and a transparent bottom view.

Figure 6:
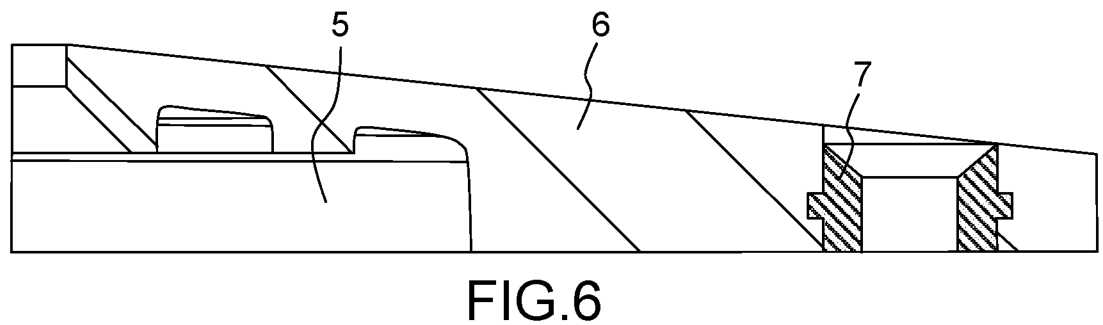
FIG. 6 schematically illustrates a sectional view of the cover of the probe, passing through an outer insert, according to one aspect of the invention.
Figure 7:
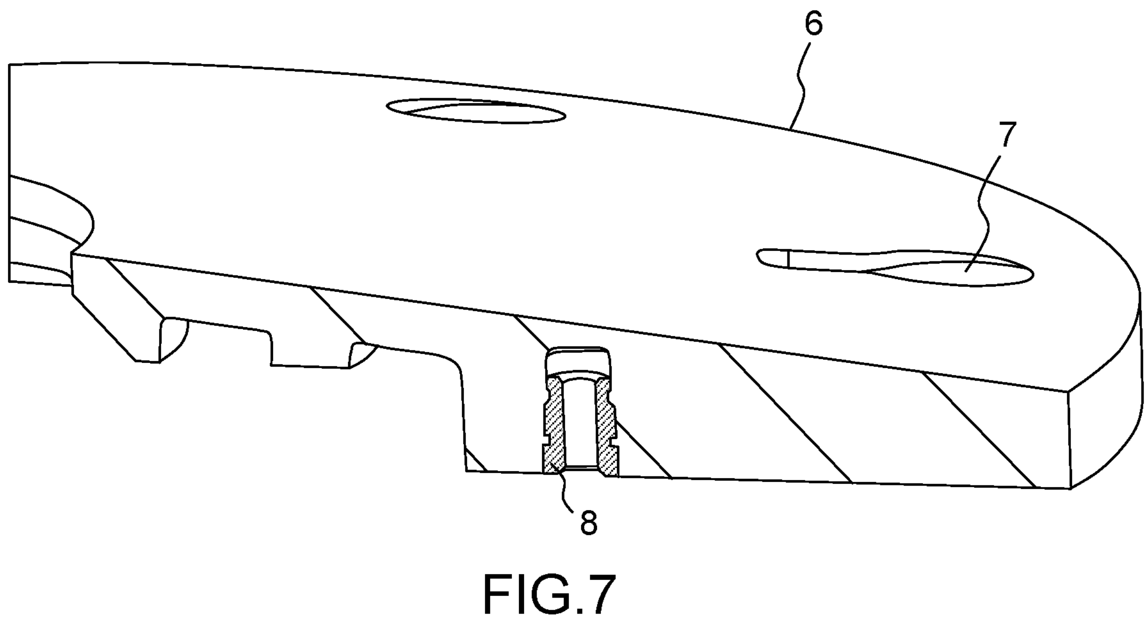
FIG. 7 schematically illustrates a sectional view of the cover of the probe, passing through an inner insert, according to one aspect of the invention.

FIG. 6 shows a sectional view of a first insert 7 made of stainless steel, and FIG. 7 shows a sectional view of a second insert 8 made of brass.

For example, a metallic electrical continuity insert 9 comprises a first insert 7 and a second insert 8 and a stainless steel portion 10 connecting said first insert 7 and said second insert 8.

Figure 8:
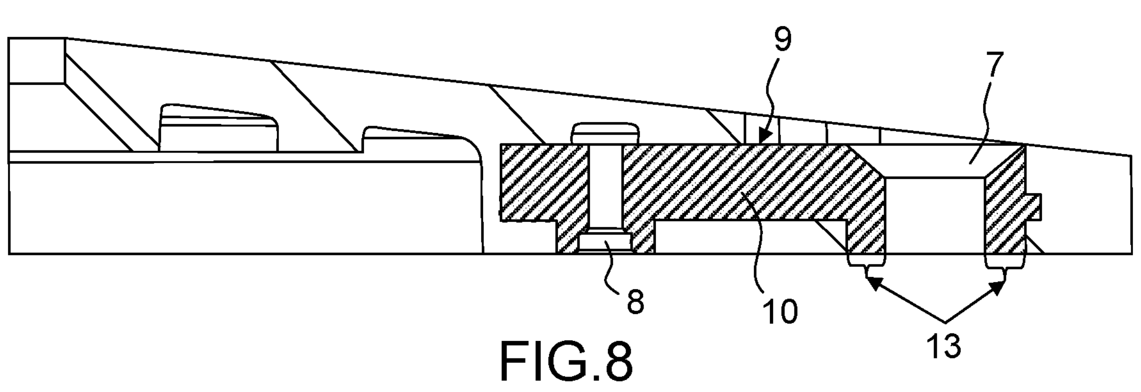
FIG. 8 schematically illustrates a sectional view of the cover of the probe, passing through an electrical continuity insert, according to one aspect of the invention.

FIG. 8 shows a sectional view of such a metallic electrical continuity insert 9.

The presence of at least one such metallic electrical continuity insert 9 makes it possible to establish the electrical link between the inside and the outside of the probe, in order to be able to carry out a sufficiently reliable measurement for verifying ground continuity once the cover 6 has been installed on an aircraft and the fastening has been implemented.

Figure 9:
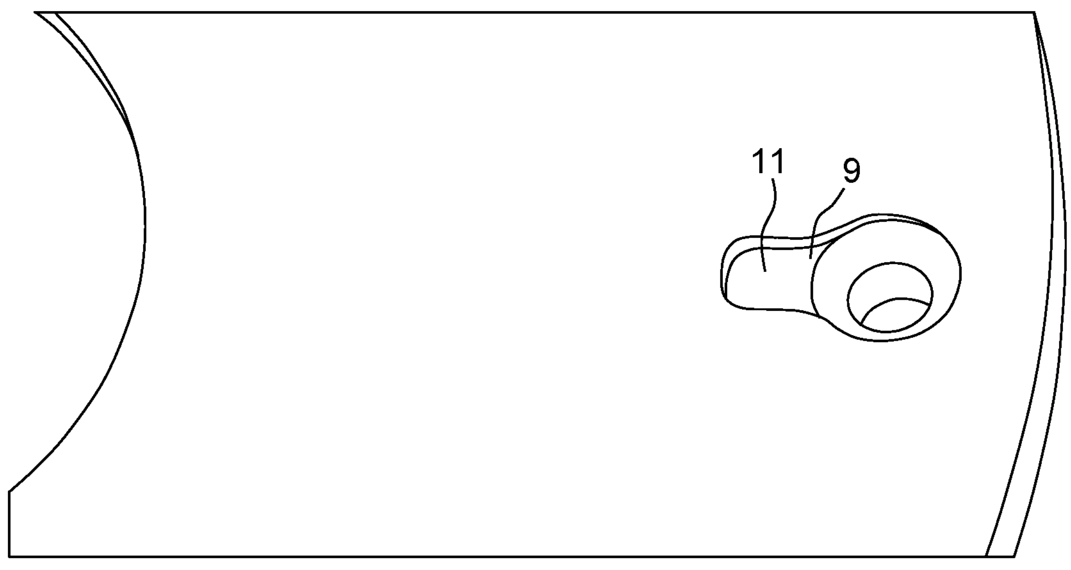
FIG. 9 schematically illustrates a clearance in the cover in the region of an electrical continuity insert according to one aspect of the invention.

FIG. 9 shows a clearance 11 in the cover 6 in the region of an electrical continuity insert 9, on the upper part of the cover 6. The clearance 11 is configured for access to the upper part of the stainless steel portion 10 of the metallic electrical continuity insert 9, in the vicinity of its second insert 8, so as to be able to carry out a sufficiently reliable and easy measurement for verifying ground continuity once the cover 6 has been installed on an aircraft and the fastening has been implemented.

An aerodynamic measurement probe according to the present invention makes it possible to hold an aerodynamic measurement probe with a cover having an optimized mass while still ensuring mechanical strength, electrical continuity and thermal protection.

The invention claimed is:

1. An aerodynamic measurement probe to measure a local angle of attack of an airflow circulating along an aircraft fuselage, comprising a support, a heated body and a shaft that is able to rotate about a longitudinal axis with respect to the support and the body, the support, the body on one hand and the shaft on the other hand being configured to form a gap, to maintain functional play to allow one end of the shaft to pivot freely in the support, and communicating with a circuit for discharging impurities, the shaft comprising a part internal to the support, a vane part external to the support and a base plate of the vane part connecting the internal part and the external part, the support comprising a circular cover with a central opening which is passed through by the shaft, an outer surface of the circular cover comprising a frusto-conical face exhibiting symmetry of revolution about the longitudinal axis, the circular cover being made of polyether ether ketone reinforced with glass or carbon fibers, and being provided with fastening metallic inserts for fastening of said circular cover on the aircraft fuselage or on the support, and with at least one metallic electrical continuity insert that establishes an electrical connection between an inner part of the probe and an interface of one of said fastening metallic inserts, said interface being disposed away from the shaft compared to said inner part of the probe.

2. The probe as claimed in claim 1, wherein said fastening metallic inserts comprise first inserts made of stainless steel disposed in a circular manner toward an outside of the circular cover, and second inserts made of brass disposed in a circular manner toward an inside of the circular cover.

3. The probe as claimed in claim 2, wherein said at least one metallic electrical continuity insert incorporates a first fastening insert and a second fastening insert and a stainless steel portion connecting said first fastening insert and said second fastening insert.

4. The probe as claimed in claim 3, wherein the circular cover comprises a clearance on an upper part of said circular cover, configured for access to an upper part of a stainless steel portion of said at least one metallic electrical continuity insert, in a vicinity of said second fastening insert.

* * * * *